_(12)_ United States Patent
Yang et al.

(10) Patent No.: US 9,644,122 B2
(45) Date of Patent: May 9, 2017

(54) MODIFIED ACRYLATE ADHESIVE RESIN AND PRODUCTION PROCESS OF THE SAME, PHOTOSENSITIVE RESIN COMPOSITION, DISPLAY SUBSTRATE, LIQUID CRYSTAL PANEL

(71) Applicants: BOE Technology Group Co., Ltd., Beijing (CN); Beijing BOE Display Technology Co., Ltd., Beijing (CN)

(72) Inventors: Tonghua Yang, Beijing (CN); Min Li, Beijing (CN); Sikai Zhang, Beijing (CN); He Feng, Beijing (CN); Ming Dong, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 11 days.

(21) Appl. No.: 14/499,425

(22) Filed: Sep. 29, 2014

(65) Prior Publication Data
US 2015/0368526 A1    Dec. 24, 2015

(30) Foreign Application Priority Data

Jun. 24, 2014  (CN) .......................... 2014 1 0288878

(51) Int. Cl.
| C09J 153/00 | (2006.01) |
| G02F 1/1339 | (2006.01) |
| C08F 299/00 | (2006.01) |

(52) U.S. Cl.
CPC .......... C09J 153/00 (2013.01); C08F 299/00 (2013.01); G02F 1/1339 (2013.01); B32B 2457/202 (2013.01); G02F 2001/13398 (2013.01); Y10T 428/1059 (2015.01); Y10T 428/24752 (2015.01)

(58) Field of Classification Search
None
See application file for complete search history.

(56) References Cited

U.S. PATENT DOCUMENTS

| 2007/0172756 A1* | 7/2007 | Ishikawa | ................. G03F 7/027 430/270.1 |
| 2009/0120775 A1* | 5/2009 | Morita | .................... C08L 65/00 200/56 R |
| 2012/0202910 A1* | 8/2012 | Shirai | ..................... C08F 36/04 522/33 |
| 2012/0241071 A1* | 9/2012 | Niimi | ....................... B32B 7/06 156/60 |

\* cited by examiner

*Primary Examiner* — Mark Ruthkosky
*Assistant Examiner* — Anthony J Frost
(74) *Attorney, Agent, or Firm* — Westman, Champlin & Koehler, P.A.

(57) ABSTRACT

The invention discloses a modified acrylate adhesive resin and a production process of the same, a photosensitive resin composition, a display substrate, and a liquid crystal panel. This resin can improve the compression displacement and elastic recovery rate of the column-like spacers between two substrates of the liquid crystal display. The modified acrylate adhesive resin disclosed by the invention is an acrylate adhesive resin modified by a terminal hydroxyl-containing polybutadiene polymer, and has the following general structural formula:

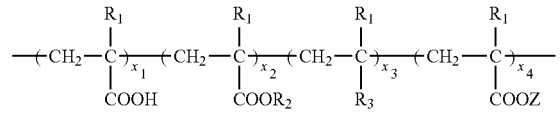

in which formula Z is:

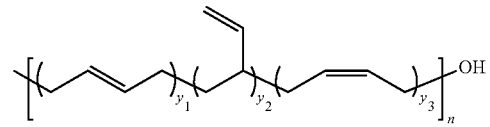

wherein $y_1+y_2+y_3=1$; and n is an integer of 3-30; in which formula $R_1$ is a hydrogen atom or an alkyl group; $R_2$ is an alkyl group or an aralkyl group; $R_3$ is an aromatic carbon ring; $x_1$ is an integer of 1-300; $x_2$ is an integer of 1-300; $x_3$ is an integer of 1-300; and $x_4$ is an integer of 2-30. The resin of the invention can be used for producing spacers.

8 Claims, No Drawings

MODIFIED ACRYLATE ADHESIVE RESIN AND PRODUCTION PROCESS OF THE SAME, PHOTOSENSITIVE RESIN COMPOSITION, DISPLAY SUBSTRATE, LIQUID CRYSTAL PANEL

CROSS-REFERENCE TO RELATED APPLICATION

This application claims the benefit of Chinese Patent Application No. 201410288878.X filed on Jun. 24, 2014 in the State Intellectual Property Office of China, the whole disclosure of which is incorporated herein by reference.

FIELD OF THE INVENTION

The invention relates to the field of liquid crystal display, in particular, to a modified acrylate adhesive resin and a production process of the same, a photosensitive resin composition, a display substrate, and a liquid crystal panel.

BACKGROUND OF THE INVENTION

Liquid crystal panel is an important component of a liquid crystal display device. Generally, a liquid crystal panel comprises a color film substrate, an array substrate and a liquid crystal layer disposed between the two substrates. The liquid crystal display device displays an image by the birefringence effect of the liquid crystal. Therefore, the stability of the thickness of the liquid crystal layer greatly affects the display quality of the liquid crystal display device.

The color film substrate and the array substrate are disposed in parallel and oppositely. Further, column-like spacers are provided between the two substrates to keep the thickness of the liquid crystal layer (i.e. the thickness of the cell). The column-like spacers in prior art have a lower compression displacement and a lower compression recovery rate. When external stress is applied on the liquid crystal panel, the distortion or displacement of the column-like spacers will result local stress on the substrate glass of the color film substrate and array substrate. The concentration or accumulation of such stress will cause the distortion and deformation of the glass, which would result in that gap defects occur between pixels or within a pixel. This gap defect will cause the color defect or contrast defect of the liquid crystal panel and thereby result in deterioration of the quality of the displayed image.

SUMMARY OF THE INVENTION

An object of the invention is to provide a modified acrylate adhesive resin and a production process of the same, a photosensitive resin composition, a display substrate, and a liquid crystal panel, wherein the modified acrylate adhesive resin has excellent flexibility, so that the spacers made of the photosensitive resin composition comprising the modified acrylate adhesive resin have excellent compression displacement and elastic recovery rate.

In order to achieve the above-mentioned object, the invention adopts the following technical solutions.

In one aspect, the invention provides a modified acrylate adhesive resin, being an acrylate adhesive resin modified by a terminal hydroxyl-containing polybutadiene polymer, and having the following general structural formula:

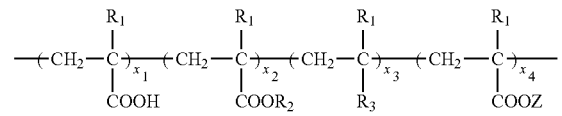

in which formula Z is:

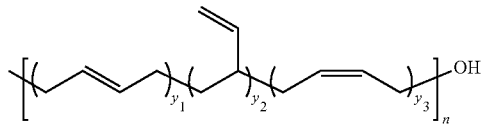

wherein $y_1+y_2+y_3=1$; and n is an integer of 3-30;
in which formula $R_1$ is a hydrogen atom or an alkyl group; $R_2$ is an alkyl group or an aralkyl group; and $R_3$ is an aromatic carbon ring; and
$x_1$ is an integer of 1-300; $x_2$ is an integer of 1-300; $x_3$ is an integer of 1-300; and $x_4$ is an integer of 2-30.

Specifically, the weight-average molecular weight of the acrylate adhesive resin modified by a terminal hydroxyl-containing polybutadiene polymer is 5000-100000.

Preferably, the weight-average molecular weight of the acrylate adhesive resin modified by a terminal hydroxyl-containing polybutadiene polymer is 5000-50000.

In another aspect, the invention also provides a photosensitive resin composition, comprising: the acrylate adhesive resin modified by a terminal hydroxyl-containing polybutadiene polymer provided by any one of the above-mentioned technical solutions, an ethylenically unsaturated bond-containing monomer, a photopolymerization initiator, an organic solvent, and an additive.

Preferably, the weight percent of the acrylate adhesive resin modified by a terminal hydroxyl-containing polybutadiene polymer is 5%-30%, the weight percent of the ethylenically unsaturated bond-containing monomer is 5%-30%, the weight percent of the photopolymerization initiator is 0.1%-10%, the weight percent of the organic solvent is 20%-88%, and the weight percent of the additive is 0.01%-10%.

In still another aspect, the invention also provides a display substrate, comprising an underlaying substrate and spacers located on the underlaying substrate, wherein the spacers are made of the photosensitive resin composition provided by any one of the technical solutions of the invention.

In yet another aspect, the invention also provides a liquid crystal panel, comprising the display substrate provided by the invention.

In further another aspect, the invention also provides a production process of the modified acrylate adhesive resin of any one of the above-mentioned solutions, comprising: mixing an acrylate adhesive resin, a terminal hydroxyl-containing polybutadiene polymer, a catalyst and a solvent to yield a mixture, heating the mixture to a temperature of 100-130° C. and keeping the temperature for 1-10 h, removing the solvent by evaporation, to produce the acrylate adhesive resin modified by a terminal hydroxyl-containing polybutadiene polymer.

Optionally, in the process, the molar ratio of the terminal hydroxyl-containing polybutadiene polymer to the acrylate adhesive resin is 1:1-10.

Optionally, the applied terminal hydroxyl-containing polybutadiene polymer has a weight-average molecular weight of 1000-5000 and a hydroxyl value of 0.5-2 mmol/g.

The above-mentioned embodiments of the invention provide a modified acrylate adhesive resin and a production process of the same, a photosensitive resin composition, a display substrate, and a liquid crystal panel, wherein the acrylate adhesive resin is modified by a terminal hydroxyl-containing polybutadiene polymer (i.e. a liquid rubber). Since the terminal hydroxyl-containing polybutadiene polymer has superior mechanical properties and excellent resistance to low temperature, the flexibility of the modified acrylate adhesive resin is improved, and the column-like spacers made of this modified acrylate adhesive resin have enhanced flexibility, lower brittleness, higher compression displacement and elastic recovery rate, and better wear resistance.

DETAILED DESCRIPTION OF THE INVENTION

Further description of the above technical solutions of the invention will be made below. It is apparent that the examples described are merely a part of the examples of the invention, but not all of them. All other examples obtained by those skilled in the art without paying inventive labour fall within the protection scope of the invention.

An example of the invention provides a modified acrylate adhesive resin, being an acrylate adhesive resin modified by a terminal hydroxyl-containing polybutadiene polymer, and having the following general structural formula:

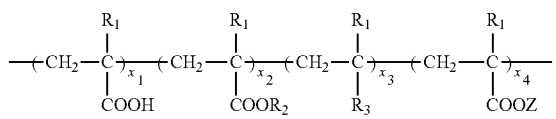

in which formula Z is:

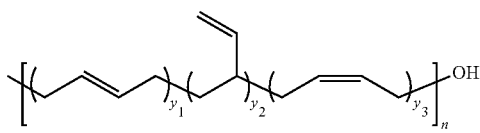

wherein $y_1+y_2+y_3=1$; and n is an integer of 3-30;
in which formula $R_1$ is a hydrogen atom or an alkyl group; $R_2$ is an alkyl group or an aralkyl group; and $R_3$ is an aromatic carbon ring; and
$x_1$ is an integer of 1-300; $x_2$ is an integer of 1-300; $x_3$ is an integer of 1-300; and $x_4$ is an integer of 2-30.

The modified acrylate adhesive resin provided by the example of the invention is obtained by modifying an acrylate adhesive resin with a terminal hydroxyl-containing polybutadiene polymer (i.e. a liquid rubber). Since the terminal hydroxyl-containing polybutadiene polymer has superior mechanical properties and excellent resistance to low temperature, the flexibility of the modified acrylate adhesive resin is improved, and the column-like spacers made of this modified acrylate adhesive resin has enhanced flexibility, lower brittleness, higher compression displacement and elastic recovery rate, and better wear resistance.

In the above general structural formula, n is an integer of 3-30, preferably an integer of 5-20.

$R_1$ is a hydrogen atom or an alkyl group. This alkyl group is preferably an alkyl group having 1-5 carbon atom(s), for example, which can be methyl, ethyl, n-propyl, isopropyl, n-butyl, isobutyl, tert-butyl, n-pentyl, isopentyl, or the like.

$R_2$ is an alkyl group or an aralkyl group. This alkyl group is preferably a linear, branched or cyclic alkyl group having 1-10 carbon atom(s), for example, which can be methyl, ethyl, n-propyl, isopropyl, cyclopropyl, n-butyl, isobutyl, tert-butyl, cyclobutyl, n-pentyl, isopentyl, neopentyl, n-hexyl, isohexyl, cylcohexyl, heptyl, octyl, nonyl, decyl, 2-ethylhexyl, or the like. This aralkyl group is an alkyl group, which is substituted by an aryl group and has 1-5 carbon atom(s), wherein the aryl group can be phenyl or naphthyl. The aralkyl group can be benzyl, phenylethyl, naphthylmethyl, naphthylethyl, or the like. In the above-mentioned formula, the monomer having $R_2$ structural unit can include esters, such as methyl(meth)acrylate, ethyl (meth)acrylate, 2-ethylhexyl(meth)acrylate, cyclohexyl (meth)acrylate, benzyl(meth)acrylate, or the like.

$R_3$ includes an aromatic carbon ring, for example, which can include phenyl, naphthyl, or the like.

$x_1$ is an integer of 1-300, preferably an integer of 50-250, more preferably an integer of 100-200;

$x_2$ is an integer of 1-300, preferably an integer of 50-250, more preferably an integer of 100-200;

$x_3$ is an integer of 1-300, preferably an integer of 50-250, more preferably an integer of 100-200;

$x_4$ is an integer of 2-30, preferably an integer of 5-25, more preferably an integer of 5-20.

Specifically, the weight-average molecular weight of the acrylate adhesive resin modified by a terminal hydroxyl-containing polybutadiene polymer is 5000-100000, preferably 5000-50000, more preferably 8000-20000.

In another aspect, the invention also provides a photosensitive resin composition, comprising: the acrylate adhesive resin modified by a terminal hydroxyl-containing polybutadiene polymer provided by any one of the examples of the invention, in addition to an ethylenically unsaturated bond-containing monomer, a photopolymerization initiator, an organic solvent, and an additive.

Specifically, in the photosensitive resin composition, the weight percent of the acrylate adhesive resin modified by a terminal hydroxyl-containing polybutadiene polymer is 5%-30%, the weight percent of the ethylenically unsaturated bond-containing monomer is 5%-30%, the weight percent of the photopolymerization initiator is 0.1%-10%, the weight percent of the organic solvent is 20%-88%, and the weight percent of the additive is 0.01%-10%.

Furthermore, in the photosensitive resin composition, the weight percent of the acrylate adhesive resin modified by a terminal hydroxyl-containing polybutadiene polymer is 5%-20%, the weight percent of the ethylenically unsaturated bond-containing monomer is 5%-20%, the weight percent of the photopolymerization initiator is 0.5%-8%, the weight percent of the organic solvent is 47%-70%, and the weight percent of the additive is 0.01%-5%.

Specifically, in the photosensitive resin composition, the examples of the ethylenically unsaturated bond-containing monomer can include at least one of dipentaerythritol hexa-acrylate (DPHA), trihydroxymethylpropane triacrylate (TMPTA), dipentaerythritol penta-acrylate (DPPA), pentaerythritol triacrylate, pentaerythritol tetra-acrylate, and di(trihydroxymethylpropane)tetra-acrylate.

The examples of the photopolymerization initiator can include at least one of benzophenone, tetramethyl Michler's ketone, tetraethyl Michler's ketone, isopropyl thioxanthone, 2-hydroxy-2-methyl-1-phenyl-1-acetone (P.I.-1173), 1-hydroxycyclohexylphenylmethylketone (P.I.-184), and 2-phenylbenzyl-2-dimethylamine-4'-morpholinopropylphenylketone (P.I.-369).

The examples of the organic solvent can be esters, ketones, ethers or aromatic hydrocarbon-based solvents, for examples, which can include at least one of propylene glycol methyl ether acetate (PGMEA), ethyl 3-ethoxypropionate, cyclohexanone, glycol ether, diglycol dimethyl ether, ethyl acetate, methylethylketone, methylisobutylketone, propylene glycol monomethyl ether, cyclohexane, and xylene.

The examples of the additive can include at least one of: silane coupling agents (e.g. KH-560, KH-570) and leveling agents (e.g. EFKA-3883, EFKA-3600).

In still another aspect, the invention also provides a display substrate, comprising an underlaying substrate and spacers located on the underlaying substrate, wherein the spacers are made of the photosensitive resin composition provided by any one of the technical solutions of the invention. Specifically, the display substrate can be an array substrate, or a color film substrate. No limitation to it is made in the invention.

The terminal hydroxyl-containing polybutadiene polymer itself has superior mechanical properties and resistance to low temperature. When the spacers made of the conventional acrylate adhesive resin are modified by such a polymer, the flexibility of the material of the spacers would be improved. Additionally, since an unsaturated double bond group is contained in the terminal hydroxyl-containing polybutadiene polymer, in the case that reaction is carried out by illumination during the process for producing the spacers, these unsaturated double bonds will take part in the reaction with the polymerizable monomers containing ethylenically unsaturated bonds, so that the resultant crosslink of the spacers are tighter, and thereby the material of the spacers has excellent compression displacement, elastic recovery rate and wear resistance. Thus, there is larger frictional resistance between the spacers and the underlaying substrate. Sliding is difficult to occur, and scraps are difficult to appear.

In yet another aspect, the invention also provides a liquid crystal panel made of any one of the display substrates provided by the examples of the invention.

Since the spacers provided by the examples of the invention have excellent compression displacement, elastic recovery rate and wear resistance, the liquid crystal panel has less gap defects. Therefore, the color defect or contrast defect of the liquid crystal panel is reduced, and thereby the quality of the displayed image is improved.

Correspondingly, the examples of the invention provide a production process of the modified acrylate adhesive resin, which can produce any one of the modified acrylate adhesive resins provided above. The production process comprises mixing an acrylate adhesive resin, a terminal hydroxyl-containing polybutadiene polymer, a catalyst, and a solvent to yield a mixture, heating the mixture to a temperature of 100-130° C. and keeping the temperature for 1-10 h, removing the solvent by evaporation, to produce the acrylate adhesive resin modified by a terminal hydroxyl-containing polybutadiene polymer.

In the process, the molar ratio of the terminal hydroxyl-containing polybutadiene polymer to the acrylate adhesive resin is 1:1-10, preferably 1:3-7, for example, 1:1, 1:2, 1:3, 1:4, 1:5, 1:6, 1:7, 1:8, 1:9, 1:10.

Specifically, the terminal hydroxyl-containing polybutadiene polymer used has a weight-average molecular weight of 1000-5000 and a hydroxyl value of 0.5-2 mmol/g. For example, a terminal hydroxyl-containing polybutadiene polymer having a weight-average molecular weight of 1500, 2500, 2700-3000, 2500-2800, 2800-3600, 3300-4400, 1000-3000 or ca. 2800 can be applied. Specifically, the terminal hydroxyl-containing polybutadiene polymer can be obtained in the market. Therefore, the terminal hydroxyl-containing polybutadiene polymer is not further described in details.

In another inspect, the examples of the invention also provide a production process of the photosensitive resin composition, which can produce any one of the photosensitive resin compositions provided above. The production process comprises sufficiently mixing the acrylate adhesive resin modified by a terminal hydroxyl-containing polybutadiene polymer, an ethylenically unsaturated bond-containing monomer, a photopolymerization initiator, an organic solvent, and an additive, to produce the photosensitive resin composition.

For detailed description of the modified acrylate adhesive resin, photosensitive resin composition and the production processes thereof, the display substrate, and the liquid crystal panel provided by the examples of the invention, they are introduced by referring to specific examples.

EXAMPLES

Synthesis of Acrylate Adhesive Resin:
Reaction Example 1)

100 g methacrylic acid, 150 g styrene, 250 g methyl methacrylate and 1.5 g dodecanethiol were weighted out and added into a 3 L four-necked flask. 950 ml propylene glycol methyl ether acetate (PGMEA) was added thereinto for dilution. 1.25 g Azo-bis-iso-butyrynitrile (AIBN) was weighted out, dissolved in 50 ml PGMEA, followed by being added into a drop funnel, which was connected to the four-necked flask. $N_2$ and cooling water were charged thereto, and the mixture was heated under stirring. Once the temperature was constant at 80° C., the initiator solution was added in drops over 20 min. The reaction was carried out for 3 h in the condition of heat insulation. A light-yellow transparent clear resin solution, i.e. the acrylate adhesive resin, was produced. According to measurement for the product, the solid content was 32.5%, the acid value was 112.2 mgKOH/g, and the weight-average molecular weight Mw=6500.

Reaction Example 2)

125 g methacrylic acid, 130 g styrene, 245 g methyl methacrylate and 1 g dodecanethiol were weighted out and added into a four-necked flask. 950 ml PGMEA was added thereinto for dilution. 1 g AIBN was weighted out, dissolved in 50 ml PGMEA, followed by being added into a drop funnel, which was connected to the four-necked flask. $N_2$ and cooling water were charged thereto, and the mixture was heated under stirring. Once the temperature was constant at 80° C., the initiator solution was added in drops over 30 min. After the reaction was carried out for 5 h in the condition of heat insulation, the temperature was increased to 110° C., and then the reaction was further carried out for 2 h in the condition of heat insulation. A light-yellow transparent clear resin solution, i.e. the acrylate adhesive resin, was produced. According to measurement for the product, the solid content was 34.8%, the acid value was 140.5 mgKOH/g, and the weight-average molecular weight Mw=11300.

Reaction Example 3)

125 g methacrylic acid, 105 g styrene, 270 g methyl methacrylate and 1 g dodecanethiol were weighted out and added into a four-necked flask. 950 ml PGMEA was added thereinto for dilution. 0.8 g AIBN was weighted out, dissolved in 50 ml PGMEA, followed by being added into a drop funnel, which was connected to the four-necked flask. N₂ and cooling water were charged thereto, and the mixture was heated under stirring. Once the temperature was constant at 70° C., the initiator solution was added in drops over 30 min. After the reaction was carried out for 4 h in the condition of heat insulation, the temperature was increased to 100° C., and then the reaction was further carried out for 2.5 h in the condition of heat insulation. A light-yellow transparent clear resin solution, i.e. the acrylate adhesive resin, was produced. According to measurement for the product, the solid content was 33.5%, the acid value was 141.6 mgKOH/g, and the weight-average molecular weight Mw=14800.

Reaction Example 4)

125 g methacrylic acid, 100 g styrene, 200 g methyl methacrylate and 100 g benzyl methacrylate were weighted out and added into a four-necked flask. 950 ml PGMEA was added thereinto for dilution. 0.7 g AIBN was weighted out, dissolved in 50 ml PGMEA, followed by being added into a drop funnel, which was connected to the four-necked flask. N₂ and cooling water were charged thereto, and the mixture was heated under stirring. Once the temperature was constant at 60° C., the initiator solution was added in drops over 30 min After the reaction was carried out for 5 h in the condition of heat insulation, the temperature was increased to 100° C., 0.3 gAIBN was added thereinto and then the reaction was further carried out for 3 h in the condition of heat insulation. A light-yellow transparent clear resin solution, i.e. the acrylate adhesive resin, was produced. According to measurement for the product, the solid content was 34.5%, the acid value was 144.6 mgKOH/g, and the weight-average molecular weight Mw=86000.

Synthesis of the Acrylate Adhesive Resin Modified by a Terminal Hydroxyl-Containing Polybutadiene Polymer:

Example 1

In a 500 ml three-necked flask equipped with a cooling conduit, a delivery device and a stirrer, 50 parts by weight of toluene serving as solvent was charged. 50 g (1.54 mmol) the acrylate adhesive resin solution produced in the above-mentioned Reaction Example 1), 0.84 g terminal hydroxyl-containing polybutadiene (HTPB, Qilu Ethylene Chemical Industry, Ltd., Zibo, Mw=1500, ca. 0.56 mmol), 0.05 g p-toluenesulfonic acid and 0.005 g hydroquinone were added into the three-necked flask. The temperature was increased under nitrogen atmosphere to 110° C. After the reaction was carried out for 5 h in the condition of heat insulation, toluene was removed by evaporation, so that the solution of the acrylate adhesive resin modified by a terminal hydroxyl-containing polybutadiene polymer was produced.

According to measurement for the product, the acid value was 80.7 mgKOH/g, and the solid content was 32.9%. Here, the weight-average molecular weight of the acrylate adhesive resin modified by a terminal hydroxyl-containing polybutadiene polymer Mw=6700.

Example 2

In a 500 ml three-necked flask equipped with a cooling conduit, a delivery device and a stirrer, 50 parts by weight of toluene serving as solvent was charged. 50 g (1.54 mmol) the acrylate adhesive resin solution produced in the above-mentioned Reaction Example 2), 0.22 g terminal hydroxyl-containing polybutadiene (HTPB, Qilu Ethylene Chemical Industry, Ltd., Zibo, Mw=1500, ca. 0.15 mmol), 0.1 g p-toluenesulfonic acid and 0.005 g hydroquinone were added into the three-necked flask. The temperature was increased under nitrogen atmosphere to 110° C. After the reaction was carried out for 5 h in the condition of heat insulation, toluene was removed by evaporation, so that the solution of the acrylate adhesive resin modified by a terminal hydroxyl-containing polybutadiene polymer was produced.

According to measurement for the product, the acid value was 120.1 mgKOH/g, and the solid content was 35.1%. Here, the weight-average molecular weight of the acrylate adhesive resin modified by a terminal hydroxyl-containing polybutadiene polymer Mw=11500.

Example 3

In a 500 ml three-necked flask equipped with a cooling conduit, a delivery device and a stirrer, 50 parts by weight of toluene serving as solvent was charged. 50 g (1.54 mmol) the acrylate adhesive resin solution produced in the above-mentioned Reaction Example 2), 1.05 g terminal hydroxyl-containing polybutadiene (HTPB, Qilu Ethylene Chemical Industry, Ltd., Zibo, Mw=1500, ca. 0.7 mmol), 0.12 g p-toluenesulfonic acid and 0.005 g hydroquinone were added into the three-necked flask. The temperature was increased under nitrogen atmosphere to 105° C. After the reaction was carried out for 6 h in the condition of heat insulation, toluene was removed by evaporation, so that the solution of the acrylate adhesive resin modified by a terminal hydroxyl-containing polybutadiene polymer was produced.

According to measurement for the product, the acid value was 102.4 mgKOH/g, and the solid content was 35.2%. Here, the weight-average molecular weight of the acrylate adhesive resin modified by a terminal hydroxyl-containing polybutadiene polymer Mw=11800.

Example 4

In a 500 ml three-necked flask equipped with a cooling conduit, a delivery device and a stirrer, 50 parts by weight of toluene serving as solvent was charged. 50 g (1.54 mmol) the acrylate adhesive resin solution produced in the above-mentioned Reaction Example 2), 1.36 g terminal hydroxyl-containing polybutadiene (HTPB, Qilu Ethylene Chemical Industry, Ltd., Zibo, Mw=1500, ca. 0.91 mmol), 0.15 g p-toluenesulfonic acid and 0.005 g p-hydroxyanisole were added into the three-necked flask. The temperature was increased under nitrogen atmosphere to 110° C. After the reaction was carried out for 5 h in the condition of heat insulation, toluene was removed by evaporation, so that the solution of the acrylate adhesive resin modified by a terminal hydroxyl-containing polybutadiene polymer was produced.

According to measurement for the product, the acid value was 90.3 mgKOH/g, and the solid content was 34.9%. Here, the weight-average molecular weight of the acrylate adhesive resin modified by a terminal hydroxyl-containing polybutadiene polymer Mw=12000.

Example 5

In a 500 ml three-necked flask equipped with a cooling conduit, a delivery device and a stirrer, 50 parts by weight of toluene serving as solvent was charged. 50 g (1.54 mmol) the acrylate adhesive resin solution produced in the above-mentioned Reaction Example 2), 1.87 g terminal hydroxyl-containing polybutadiene (HTPB, Qilu Ethylene Chemical Industry, Ltd., Zibo, Mw=1500, 1.25 mmol), 0.2 g p-toluenesulfonic acid and 0.008 g p-hydroxyanisole were added into the three-necked flask. The temperature was increased under nitrogen atmosphere to 120° C. After the reaction was carried out for 6 h in the condition of heat insulation, toluene was removed by evaporation, so that the solution of the acrylate adhesive resin modified by a terminal hydroxyl-containing polybutadiene polymer was produced.

According to measurement for the product, the acid value was 90.3 mgKOH/g, and the solid content was 34.9%. Here, the weight-average molecular weight of the acrylate adhesive resin modified by a terminal hydroxyl-containing polybutadiene polymer Mw=12110.

Example 6

In a 500 ml three-necked flask equipped with a cooling conduit, a delivery device and a stirrer, 50 parts by weight of toluene serving as solvent was charged. 50 g (1.13 mmol) the acrylate adhesive resin solution produced in the abovementioned Reaction Example 3), 1.49 g terminal hydroxyl-containing polybutadiene (HTPB, Qilu Ethylene Chemical Industry, Ltd., Zibo, Mw=2500, ca. 0.6 mmol), 0.2 g p-toluenesulfonic acid and 0.007 g p-hydroxyanisole were added into the three-necked flask. The temperature was increased under nitrogen atmosphere to 110° C. After the reaction was carried out for 5 h in the condition of heat insulation, toluene was removed by evaporation, so that the solution of the acrylate adhesive resin modified by a terminal hydroxyl-containing polybutadiene polymer was produced.

According to measurement for the product, the acid value was 109.5 mgKOH/g, and the solid content was 33.6%. Here, the weight-average molecular weight of the acrylate adhesive resin modified by a terminal hydroxyl-containing polybutadiene polymer Mw=15350.

Example 7

In a 500 ml three-necked flask equipped with a cooling conduit, a delivery device and a stirrer, 50 parts by weight of toluene serving as solvent was charged. 50 g (1.13 mmol) the acrylate adhesive resin solution produced in the abovementioned Reaction Example 4), 1.76 g terminal hydroxyl-containing polybutadiene (HTPB, Qilu Ethylene Chemical Industry, Ltd., Zibo, Mw=2500, ca. 0.7 mmol), 0.2 g p-toluenesulfonic acid and 0.008 g p-hydroxyanisole were added into the three-necked flask. The temperature was increased under nitrogen atmosphere to 110° C. After the reaction was carried out for 5 h in the condition of heat insulation, toluene was removed by evaporation, so that the solution of the acrylate adhesive resin modified by a terminal hydroxyl-containing polybutadiene polymer was produced.

According to measurement for the product, the acid value was 103.2 mgKOH/g, and the solid content was 34.1%. Here, the weight-average molecular weight of the acrylate adhesive resin modified by a terminal hydroxyl-containing polybutadiene polymer Mw=86620.

Production of Photosensitive Resin Composition:

Comparative Example 1

5 parts by weight (in term of the weight fraction of the solid content) of the acrylate adhesive resin solution produced in Reaction Example 1), 10 parts by weight of dipentaerythritol hexa-acrylate DPHA, 10 parts by weight of trihydroxymethylpropane triacrylate TMPTA, 4 parts by weight of photopolymerization initiator P.I.-1173, 70.99 parts by weight of propylene glycol methyl ether acetate PGMEA, and 0.01 part by weight of KH-560 were added into a disperser and dispersed for 2 h at 800 r/min, to produce the photosensitive resin composition.

Comparative Example 2

7 parts by weight (in term of the weight fraction of the solid content) of the acrylate adhesive resin solution produced in Reaction Example 1), 4 parts by weight of dipentaerythritol hexa-acrylate DPHA, 3 parts by weight of dipentaerythritol penta-acrylate DPPA, 0.5 part by weight of photopolymerization initiator P.I.-184, 60 parts by weight of propylene glycol methyl ether acetate PGMEA, 24.5 parts by weight of diglycol dimethyl ether, 0.5 part by weight of KH-560, and 0.5 part by weight of EFKA-3883 were added into a disperser and dispersed for 2 h at 800 r/min, to produce the photosensitive resin composition.

Example 8

5 parts by weight (in term of the weight fraction of the solid content) of the solution of the acrylate adhesive resin modified by a terminal hydroxyl-containing polybutadiene polymer produced in Example 3, 10 parts by weight of dipentaerythritol hexa-acrylate DPHA, 10 parts by weight of trihydroxymethylpropane triacrylate TMPTA, 10 parts by weight of photopolymerization initiator P.I.-1173, 64.99 parts by weight of propylene glycol methyl ether acetate PGMEA, and 0.01 part by weight of KH-560 were added into a disperser and dispersed for 3 h at 700 r/min, to produce the photosensitive resin composition.

Example 9

7 parts by weight (in term of the weight fraction of the solid content) of the solution of the acrylate adhesive resin modified by a terminal hydroxyl-containing polybutadiene polymer produced in Example 3, 4 parts by weight of dipentaerythritol hexa-acrylate DPHA, 3 parts by weight of dipentaerythritol penta-acrylate DPPA, 0.5 part by weight of photopolymerization initiator P.I.-184, 60 parts by weight of propylene glycol methyl ether acetate PGMEA, 24.5 parts by weight of diglycol dimethyl ether, 0.5 part by weight of KH-560, and 0.5 part by weight of EFKA-3883 were added into a disperser and dispersed for 2 h at 800 r/min, to produce the photosensitive resin composition.

Example 10

15 parts by weight (in term of the weight fraction of the solid content) of the solution of the acrylate adhesive resin modified by a terminal hydroxyl-containing polybutadiene polymer produced in Example 6, 4 parts by weight of pentaerythritol tetra-acrylate, 6 parts by weight of pentaerythritol hexa-acrylate DPHA, 1 part by weight of photopolymerization initiator P.I.-369, 30 parts by weight of propylene glycol methyl ether acetate PGMEA, 42 parts by weight of diglycol dimethyl ether, 1.5 parts by weight of KH-570, and 0.5 parts of EFKA-3600 were added into a disperser and dispersed for 3.5 h at 700 r/min, to produce the photosensitive resin composition.

Example 11

10 parts by weight (in term of the weight fraction of the solid content) of the solution of the acrylate adhesive resin modified by a terminal hydroxyl-containing polybutadiene polymer produced in Example 1, 2 parts by weight of trihydroxymethylpropane triacrylate TMPTA, 8 parts by weight of dipentaerythritol penta-acrylate DPPA, 1.5 parts by weight of photopolymerization initiator P.I.-1173, 46 parts by weight of ethyl 3-ethoxypropionate, 30 parts by weight of diglycol methyl ethyl ether, 2 parts by weight of KH-570, and 0.5 part by weight of EFKA-3600 were added into a disperser and dispersed for 3 h at 800 r/min, to produce the photosensitive resin composition.

Example 12

20 parts by weight (in term of the weight fraction of the solid content) of the solution of the acrylate adhesive resin modified by a terminal hydroxyl-containing polybutadiene polymer produced in Example 5, 5 parts by weight of dipentaerythritol hexa-acrylate DPHA, 0.1 part by weight of photopolymerization initiator P.I.-369, 39.9 parts by weight of propylene glycol methyl ether acetate PGMEA, 30 parts by weight of 3-ethoxypropionate, 4 parts by weight of KH-570, and 1 part by weight of EFKA-3600 were added into a disperser and dispersed for 2 h at 800 r/min, to produce the photosensitive resin composition.

Each component of the photosensitive resin compositions in the above-mentioned Comparative Examples 1, 2 and Examples 8-12, and the content thereof, were shown in Table 1. Thereby, the difference between the photosensitive resin compositions of Comparative Examples 1, 2 and those of Examples 8-12 could be apparently observed.

TABLE 1

Each component of the photosensitive resin compositions and the content thereof

| | Acrylate adhesive resin modified by a terminal hydroxyl-containing polybutadiene polymer or acrylate adhesive resin (in term of the weight fraction of the solid content) | Ethylenically unsaturated bond-containing monomer | Photopolymerization initiator | Organic solvent | Additive |
|---|---|---|---|---|---|
| Comparative Example 1 | Acrylate adhesive resin produced in Reaction Example 1) 5% | DPHA 10% TMPTA 10% | P.I.-1173 4% | PGMEA 70.99% | KH-560 0.01% |
| Comparative Example 2 | Acrylate adhesive resin produced in Reaction Example 1) 7% | DPHA 4% DPPA 3% | P.I.-184 0.5% | PGMEA 60% diglycol dimethyl ether 24.5% | KH-560 0.5% EFKA-3883 0.5% |
| Example 8 | Acrylate adhesive resin modified by a terminal hrdroxyl-containing polybutadiene polymer produced in Example 3 5% | DPHA 10% TMPTA 10% | P.I.-1173 10% | PGMEA 64.99% | KH-560 0.01% |
| Example 9 | Acrylate adhesive resin modified by a terminal hrdroxyl-containing polybutadiene polymer produced in Example 3 7% | DPHA 4% DPPA 3% | P.I.-184 0.5% | PGMEA 60% diglycol dimethyl ether 24.5% | KH-560 0.5% EFKA-3883 0.5% |
| Example 10 | Acrylate adhesive resin modified by a terminal hrdroxyl-containing polybutadiene polymer produced in Example 6 15% | DPHA 4% DPHA 6% | P.I.-369 1% | PGMEA 30% diglycol dimethyl ether 42% | KH-560 1.5% EFKA-3600 0.5% |
| Example 11 | Acrylate adhesive resin modified by a terminal hrdroxyl-containing polybutadiene polymer produced in Example 1 10% | TMPEA 2% DPPA 8% | P.I.-1173 1.5% | 3-ethoxy propionate 46% diglycol methyl ethyl ether 30% | KH-570 2% EFKA-3600 0.5% |
| Example 12 | Acrylate adhesive resin modified by a terminal hydroxyl-containing polybutadiene polymer produced in Example 5 20% | DPHA 5% | P.I.-369 0.1% | PGMEA 39.9% 3-ethoxy propionate 30% | KH-570 4% EFKA-3600 1% |

Spacer patterns were produced by using the photosensitive resin compositions of the above-mentioned Comparative Examples 1, 2 and Examples 8-12, respectively. Specifically, the production process was:

applying the photosensitive resin composition on a glass substrate, which had been cleaned by washing, by spin-coating, drying in vacuum for 60 s, baking on a hot plate at 100° C. for 3 min, exposing with an energy of 60 mJ/cm² in an exposure machine (containing a mask engraved with a pattern of a certain shape (octagon)), then developing with potassium hydroxide developing solution for 80 s, finally baking for 30 min in an oven at 220° C., so as to produce the space pattern.

Evaluation of Properties of the Spacers

1) Measurement of Compression Displacement and Elastic Recovery Rate

The substrates having the spacer patterns made of the photosensitive resin compositions of the above-mentioned Comparative Examples 1, 2 and Examples 8-12 were machined to the basic size for the measurement of the mechanical properties (i.e. compression displacement and elastic recovery rate) of the spacers. The compression displacement and elastic recovery rate of the above-mentioned spacers were measured by a micro hardness tester (Fisher), respectively.

Measurement method: pressing the spacer pattern by using a planar impress device with a diameter of 50 um, then testing the compression displacement and elastic recovery rate of the pattern by a loading-unloading method. Here, the loading was at 50 mN/36 s, and the holding time was 5 s. The unloading was at 50 mN/36 s, and the holding time was 5 s.

During the measurement, H represents the height of the spacer, $H_1$ represents the compression displacement height of the spacer when loading, and $H_2$ represents the recovery height of the spacer when unloading.

Thus, elastic recovery rate (%)=$(H_1-H_2) \times 100/H_1$

2) Flexibility Test (GB/T 1731-93)

The above-mentioned test plates applied with the spacer pattern were bended on mandrel rods having different diameters in an elasticity tester (QTX-1, Tianjin Material Tester Factory). The minimal diameter of the mandrel rods, on which the coating film was not damaged, was used to represent the flexibility of the coating film.

3) Wear Resistance Test for Spacers

According to the standard GB/1768-79, the sample coated by the spacer pattern coating film was fixed on the working turntable of the wear resistance tester. On the loading arm, 750 g loading of a rubber abrasive wheel was applied. The weight of the sample was measured in advance. The sample was abraded with the rubber grinding wheel, until a predetermined revolution number (500 r, 1000 r, 1500 r). Then the weight was measured again. Abrasive loss and specific abrasive loss (ratio of the amount of abrasive loss to the loading) were calculated, respectively.

The results of the tests were shown in Table 2.

TABLE 2

| | Compression displacement (μm) | Elastic recovery rate | Flexibility (mm) | Wear resistance (500r, 750 g) |
|---|---|---|---|---|
| Comparative Example 1 | 0.35 | 89.2% | 1.5 | 0.12 |
| Comparative Example 2 | 0.41 | 88.6% | 1.5 | 0.19 |
| Example 8 | 0.52 | 94.6% | 1 | 0.08 |
| Example 9 | 0.55 | 93.8% | 0.5 | 0.09 |
| Example 10 | 0.59 | 94.2% | 0.5 | 0.07 |
| Example 11 | 0.48 | 94.1% | 0.5 | 0.10 |
| Example 12 | 0.58 | 93.6% | 0.5 | 0.07 |

The results in Table 2 showed that as compared with the spacers made of the photosensitive resin compositions of the Comparative Examples 1 and 2 of the invention, the spacers made of those of Examples 8-12 of the invention have higher compression displacement, and also have higher elastic recovery rate. Additionally, the spacers made of the photosensitive resin compositions of Example 8-12 have superior flexibility and wear resistance.

The spacers made of the photosensitive resin composition comprising the acrylate adhesive resin modified by a terminal hydroxyl-containing polybutadiene polymer has superior mechanical properties. The reason is as follows. The terminal hydroxyl-containing polybutadiene polymer itself has superior mechanical properties and resistance to low temperature. When the spacers made of the conventional acrylate adhesive resin is modified by such a polymer, the flexibility of the material of the spacers would be improved. Additionally, since an unsaturated double bond group is contained in the terminal hydroxyl-containing polybutadiene polymer, in the case that reaction is carried out by illumination, the double bonds will take part in the reaction with the polymerizable monomers containing ethylenically unsaturated bonds, so that the resultant crosslink of the spacers are tighter, and thereby the material of the spacers has excellent elastic recovery rate and wear resistance.

Therefore, to sum up, spacers made of the photosensitive resin compositions provided in the Examples of the invention have excellent elastic recovery rate and high toughness. Scraps are difficult to appear. Further, there is larger frictional resistance between the spacers and the TFT substrate, and thus sliding is difficult to occur.

The above description is only specific embodiments of the invention. However, the protection scope of the invention is not limited thereto. In technical scope disclosed in the invention, all the modifications and alternatives, which can be easily envisaged by those skilled in the art, should belong to the protection scope of the invention. Hence, the protection scope of the invention should comply with the protection scope of the claims.

What is claimed is:

1. A modified acrylate adhesive resin, being an acrylate adhesive resin modified by a terminal hydroxyl-containing polybutadiene polymer, and having the following general structural formula:

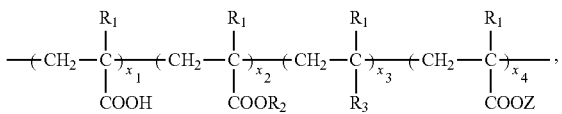

in which formula Z is:

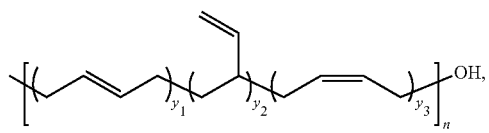

wherein $y_1+y_2+y_3=1$; and n is an integer of 3-30;

in which formula $R_1$ is a hydrogen atom or an alkyl group; $R_2$ is an alkyl group or an aralkyl group; and $R_3$ is an aromatic carbon ring; and $x_1$ is an integer of 1-300; $x_2$ is an integer of 1-300; $x_3$ is an integer of 1-300; and $x_4$ is an integer of 2-30;

the molar ratio of the terminal hydroxyl-containing polybutadiene polymer to the acrylate adhesive resin is 1:1-10, and the terminal hydroxyl-containing polybutadiene polymer has a weight-average molecular weight of 1000-5000 and a hydroxyl value of 0.5-2mmol/g, and the weight-average molecular weight of the acrylate adhesive resin modified by a terminal hydroxyl-containing polybutadiene polymer is 8000-20000.

2. A photosensitive resin composition, wherein the photosensitive resin composition comprises: the acrylate adhesive resin modified by a terminal hydroxyl-containing polybutadiene polymer according to claim 1, an ethylenically unsaturated bond-containing monomer, a photopolymerization initiator, an organic solvent, and an additive.

3. The photosensitive resin composition according to claim 2, wherein
the weight percent of the acrylate adhesive resin modified by a terminal hydroxyl-containing polybutadiene polymer is 5%-30%,
the weight percent of the ethylenically unsaturated bond-containing monomer is 5%-30%,
the weight percent of the photopolymerization initiator is 0.1%-10%,
the weight percent of the organic solvent is 20%-88%, and
the weight percent of the additive is 0.01%-10%.

4. A display substrate, comprising an underlaying substrate and spacers located on the underlaying substrate, wherein the spacers are made of the photosensitive resin composition according to claim 2.

5. A liquid crystal panel, comprising the display substrate according to claim 4.

6. A production process of the modified acrylate adhesive resin according to claim 1, comprising:
mixing an acrylate adhesive resin, a terminal hydroxyl-containing polybutadiene polymer, a catalyst and a solvent to yield a mixture, heating the mixture to a temperature of 100-130° C. and keeping the temperature for 1-10 h, removing the solvent by evaporation, to produce the acrylate adhesive resin modified by a terminal hydroxyl-containing polybutadiene polymer.

7. The production process of the modified acrylate adhesive resin according to claim 6, wherein the molar ratio of the terminal hydroxyl-containing polybutadiene polymer to the acrylate adhesive resin is 1:1-10.

8. The production process of the modified acrylate adhesive resin according to claim 6, wherein the terminal hydroxyl-containing polybutadiene polymer has a weight-average molecular weight of 1000-5000 and a hydroxyl value of 0.5-2 mmol/g.

* * * * *